United States Patent [19]

Hattori

[11] Patent Number: 4,923,250
[45] Date of Patent: May 8, 1990

[54] HEADREST APPARATUS

[75] Inventor: Takemi Hattori, Kariya, Japan

[73] Assignee: Aisin Seiki Kabushiki Kaisha, Kariya, Japan

[21] Appl. No.: 160,761

[22] Filed: Feb. 26, 1988

[30] Foreign Application Priority Data

Feb. 28, 1987 [JP] Japan .................... 62-45822

[51] Int. Cl.$^5$ .............................................. A47C 1/10
[52] U.S. Cl. ...................................... 297/410; 297/61; 297/408
[58] Field of Search .................. 297/410, 408, 403, 61

[56] References Cited

U.S. PATENT DOCUMENTS

| 2,989,341 | 6/1961 | Schliephache | 297/61 |
| 4,711,494 | 12/1987 | Duvenkamp | 297/408 X |
| 4,765,683 | 8/1988 | Hattori . | |

FOREIGN PATENT DOCUMENTS

| 209417 | 1/1987 | European Pat. Off. | 297/410 |
| 59-14530 | 1/1984 | Japan . | |
| 14530 | 1/1984 | Japan | 297/410 |
| 244632 | 12/1985 | Japan | ·297/410 |
| 432747 | 12/1967 | Switzerland | 297/410 |

Primary Examiner—Laurie K. Cranmer
Attorney, Agent, or Firm—Finnegan, Henderson, Farabow, Garrett & Dunner

[57] ABSTRACT

A headrest apparatus for vehicles comprises a pair of guide rails connected to a seatback frame, a pair of stays connected to the headrest, a pair of shoes moving along the guide rails, a rod connected at its ends to the shoes, means for moving the rod in an upward and downward direction, a cam member attached at an upper portion of each guide rail for urging the shoes in a horizontal direction and the headrest in an inclined position, and a spring member positioned on the shoes and biasing the shoes in the opposite direction of the direction in which the headrest is urged in the inclined position.

11 Claims, 3 Drawing Sheets

HEADREST APPARATUS

BACKGROUND OF THE INVENTION

1. Field of the Invention

The present invention relates to a headrest apparatus for vehicles, and more particularly to a headrest apparatus wherein a headrest can be moved to an inclined position with respect to a vehicle seat.

2. Description of the Prior Art

It is well-known for example, from the Japanese Laid-open Patent Application Publication No. 59-14530, that as shown in FIG. 4 a headrest 1 is connected to one end of each of a pair of stays 2. Each of the stays 2 is provided with a hinged portion 3 at the other end thereof. A pair of pipe-shaped supports 5 is fixed to a seatback frame 4. Under a normal condition of the headrest apparatus, the stays 2 of the headrest 1 are inserted into the supports 5 by the hinged portions 3, and a head of a passenger is supported by the headrest 1. When the headrest 1 is raised so that the hinged portions 3 of the stays 2 are pulled outwardly from the supports 5, the hinged portions 3 enable the headrest 1 to be pivoted forward with respect to the seatback.

When the headrest 1 is lifted up and is forwardly pivoted in the above conventional apparatus, a top end portion 5a of each support 5 and the hinged portion 3 of each stay 2 are exposed and constitute a projection visible from the rear portion of the vehicle. Accordingly, in case the headrest apparatus is installed on a front seat, such projections may be a hazard for passengers seated in the rear seats of the vehicle in the event of a sudden braking of the vehicle. Furthermore, it is difficult for a driver or passenger in the front seat to operate the apparatus, since he must reach back over the front seat to adjust the headrest.

SUMMARY OF THE INVENTION

An object of the present invention is to provide an improved headrest apparatus which obviates the above-mentioned drawbacks of the described conventional headrest apparatus.

A further object of the present invention is to provide an improved headrest apparatus which can be easily and reliably moved and inclined, and which does not present a safety hazard for rear seat passengers when inclined.

A still further object of the present invention is to provide an improved headrest apparatus which is relatively simple in construction, low in manufacturing cost, and reliable in operation.

To achieve the above objects and advantages, the headrest adjusting apparatus of the present invention is for a headrest of a vehicle seat including a back having a top and frame. The apparatus comprises guide means including at least one guide rail for connection to the frame; stay means including at least one stay for connection to the headrest; shoe means attached to the stay for movement with respect to the guide rail; and means for moving the shoe means with respect to the guide rail for moving the headrest with respect to the top of the seat.

Preferably, the moving means also includes means substantially confined within the seatback for turning the headrest with respect to the plane of the seatback. It is also preferred that the turning means include camming means interacting with the shoe means for rotating the headrest with respect to the plane of the seatback.

Means interacting with the guide rail for biasing the shoe means may also be included. The guide means preferably includes a pair of guide rails and the stay means may include a pair of stays. The shoe means also may include a pair of shoes, one shoe being attached to each stay and corresponding to each guide rail, and the moving means may include a rod member connected between the pair of shoes for movement therewith.

Further objects and advantages of the present invention will become apparent from the following description of a preferred embodiment taken in conjunction with the accompanying drawings.

DESCRIPTION OF THE PREFERRED EMBODIMENT

Reference will now be made in detail to the present preferred embodiment of the invention, an example of which is illustrated in the accompanying drawings. As disclosed, the invention is an apparatus for adjusting the position of a headrest with respect to a vehicle seat, the seat including a back having a top and a frame.

In accordance with the invention, the apparatus comprises guide means including at least one guide rail for connection to the frame; stay means including at least one stay for connection to the headrest; show means attached to the stay for movement with respect to the guide rail; and means for moving the shoe means with respect to the guide rail for moving the headrest with respect to the top of the seat. The moving means preferably includes means substantially confined within the seatback for the headrest with respect to the plane of the seatback, and the turning means may include camming means interacting with the shoe mans for rotating the headrest with respect to the plane of the seatback.

Figure 1:
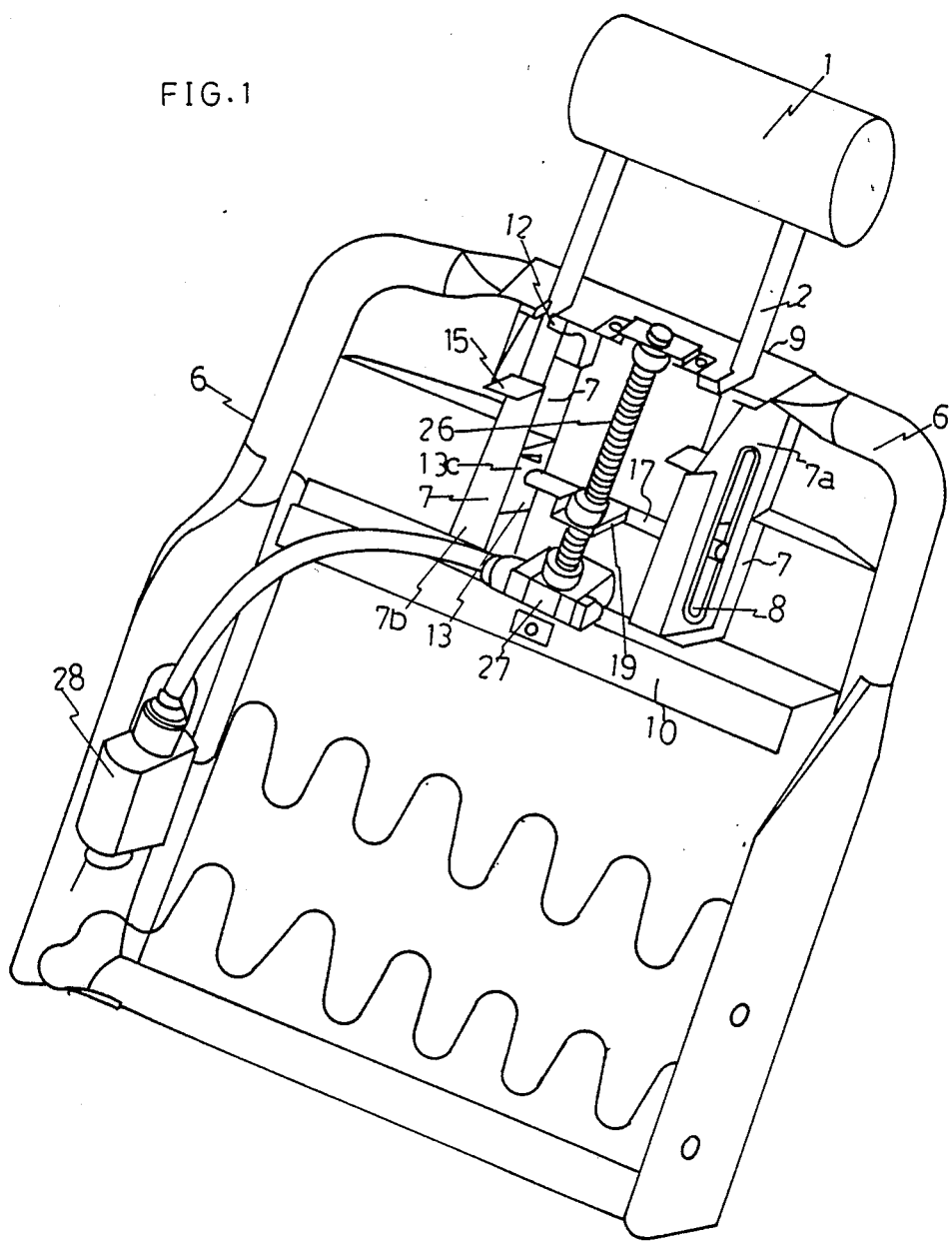
FIG. 1 is a cut-away perspective view of an automobile seat incorporating the preferred embodiment of a headrest apparatus constructed in accordance with the present invention.
Figure 2:
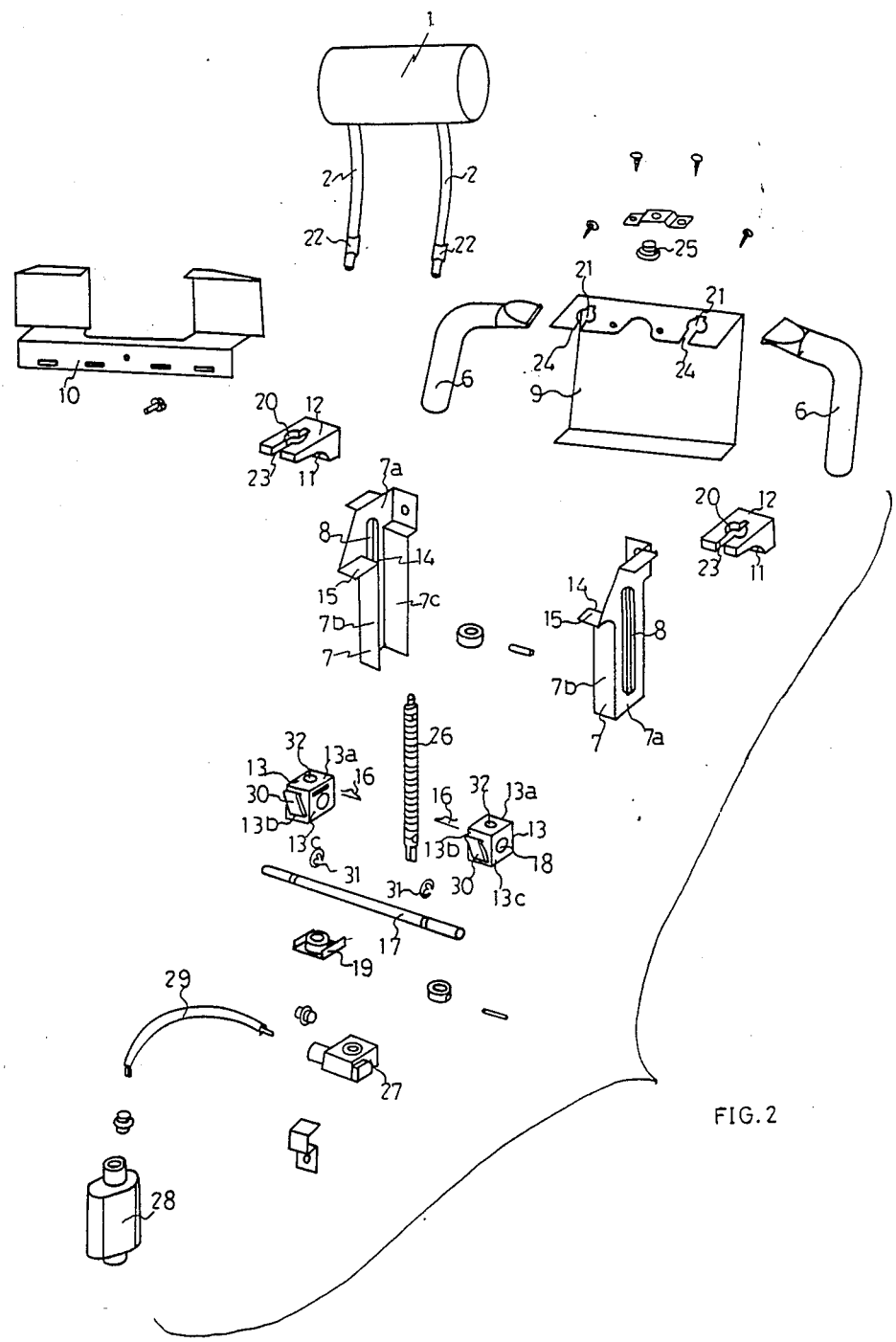
FIG. 2 is an exploded perspective view of the headrest apparatus of FIG. 1.
Figure 3:
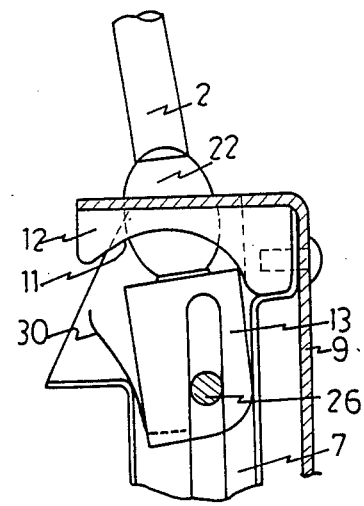
FIG. 3 is a partial sectional view taken generally along the line III—III in FIG. 1, showing a main portion of the headrest apparatus.
Figure 4:
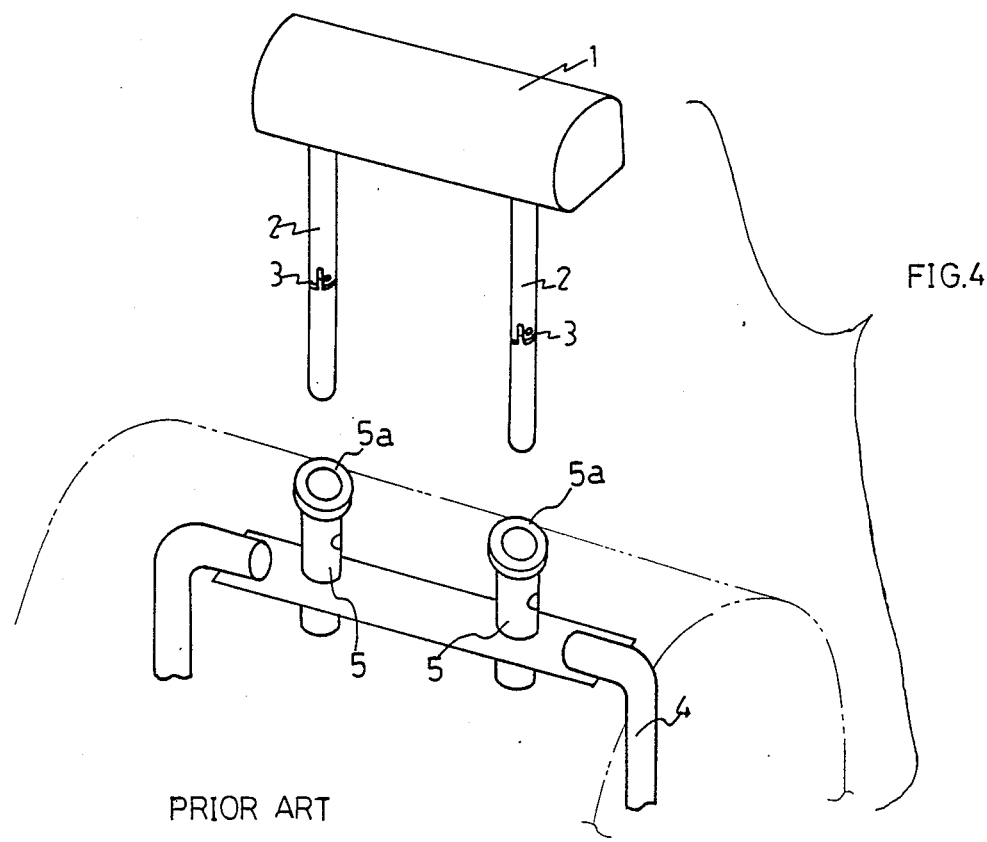
FIG. 4 is a perspective view of a conventional headrest apparatus.

Referring now FIGS. 1 and 2, in the illustrated embodiment a pair of guide rails 7 are connected to a seatback frame 6. Each guide rail 7 is substantially U-shaped in cross-section and is provided with an elongated hole 8 in a lateral wall 7a thereof. In this embodiment, the guide rails 7 are interposed and connected between an upper panel 9 and a lower panel 10, both fixed to the seatback frame 6. The upper panel 9 is provided with two aligned holes 21 each including a slit 24. A cam member 12 having a cam surface 11 is attached on an upper end of a back surface 7C of each guide rail 7. Each cam member 12 is provided with a hole 20 which is positioned on the same axis with one of the holes 21 formed in the upper panel 9. Each hole 20 includes a slit 23 positioned on the same axis with the slit 24. A front surface 7b of the guide rail 7 is provided with a guide piece 15 which is formed to be bent so that the guide piece 15 may extend parallel with the cam surface 11. A shoe 13 is located in each of the respective guide rails 7.

Each shoe 13 is provided at an upper surface 13a thereof with a hole 32 which is positioned on the same axis with the holes 20 and 21. A pair of stays 2 of the headrest 1 penetrate the holes 20 and 21. Each stay 2 has a lower portion which is inserted into one of the holes 32 and is fixed by E-ring 16. Furthermore, each stay 2 has a flat portion 22 at a suitable portion thereof which is movable within the respective slits 23 of the cam members 12 and slits 24 of the upper panel 9. Each shoe 13 has a front surface 13b with a plate spring 30 thereon. The spring 30 is continuously in contact with the front surface 7b of the guide rail 7 so as to bias the shoe 13 toward the back side direction thereof. The spring 30 is formed in approximately a second degree curve so that the plate spring 30 may take the form of a flat plate on maximum deflection. The pair of shoes 13 are connected together by a rod 17. The attachment of the rod 17 to each of the shoes 13 is accomplished by passing the rod 17 through apertures 18 formed in a side surface 13c of each shoe 13, and by holding the rod 17 in place with E-rings 17. The opposite end portions of the rod 17 extend through the elongated holes 8 of the guide rails 7, whereby the shoes 13 can move in the guide rails 7 along the elongated holes 8. A nut member 19 is fixed to the central portion of the rod 17.

In accordance with the present invention, there is provided a means for moving the rod 17 in an upward and downward direction thereby moving the shoes 13 in the respective guide rails 7 to raise and lower the headrest 1. As embodied herein the means for moving the rod 17 includes a threaded rod 26 which is rotatably supported on the upper panel 9 by a bushing 25, and includes a nut member 19 which is engaged with the threaded rod 26.

In accordance with the present invention, there is further provided a means for providing a rotational torque to the threaded rod 26 which, in the preferred embodiment described herein, comprises a gear box 27 which is fixed in the lower panel and connected to an electric motor 28 through a cable 29. The gear box 27 rotates the rod 26 receiving a rotational torque from the electric motor 28 through the cable 29. The rotational movement of the threaded rod 26 moves the nut 19 and the rod 17 vertically, thus moving shoes 13 along the guide rails 17.

In operation, referring to FIGS. 1, 2 an 3, when the electric motor 28 is actuated by a switch mechanism (not shown), the threaded rod 26 is rotated by the rotational torque of the electric motor 28. The nut member 27 is moved in an upward and downward direction as shown in the drawing by the rotational torque of the threaded rod 26. The rod 17 is moved in an upward and downward direction along the elongated hole 8 by the upward and downward movement of the nut member 27. The shoes 13 are moved in an upward and downward direction in the guide rails 7 thereby raising and lowering the headrest 1.

When the headrest 1 is raised by the above movement, the upper edge of each shoe 13 will contact the cam surface 11 of the cam membr 12. Since each of the flat portions 22 of the stays 2 move into the slits 24 of the upper panel 9 and the slits 23 of the cam member 12, the shoe 13 is moved in the upward direction along the cam surface 11. In order to remove the engagement between the shoe 13 and the cam surface 11 and to attain a smooth movement of the shoe 13, a minimum gap has to be formed between the shoe 13 and the cam surface 11 and also between the shoe 13 and an upper edge 14 of the front surface 7b of the guide rail 7, respectively. However, a backlash is produced in the headrest 1 by the minimum gaps. In the present invention, therefore, the shoes 13 are in contact with the upper edge 14 of the front surfaces 7b of the guide rails 7 through the plate spring 30. Since the shoes 13 are continuously in contact with the cam surface 11 by the biasing force of the plate spring 30, the gap between the shoe 13 and the cam surface 11 and the gap between the shoe 13 and the upper edge 14 of the front surface 7b of the guide rail 7 are removed, thereby preventing the backlash from being produced in the headrest. Since the plate spring 30 is deflected by the movement of the shoes 13, the engagement quantity between the shoe 13 and the cam surface 11 will be absorbed, whereby the shoe 13 can move smoothly along the cam surface 11. When the shoe 13 continues to move, the rod 17 will contact the upper end of the elongated hole 8, with the result that the shoe 13 is prevented from moving in the upward direction. Furthermore, the rotational movement of the shoe 13 will contact the guide piece 15, and the guide piece 15 will support the shoe 13 due to the 90 degree change of the direction of the shoe 13, whereby the rotational movement of the shoe is prevented. Therefore, the headrest 1, fixed to the stay 2, is in a forwardly inclined position. Thus, the headrest 1 can be easily maintained in the forwardly inclined position by a simple operation, namely by the operation of the electric motor 28. Since the headrest 1 is at any time positioned above the seatback frame 6, there are no portions which are dangerous for passengers. The upper end of the elongated hole 8 serves as a stop for the rising upward movement of the rod 17 during the operation and restricts the forward inclination of the headrest 1.

When the rotation of the electric motor 28 is reversed, the rotation of the cable 29 and the gear in gear box 27 is reversed and the threaded rod 26 is withdrawn through the nut member 19 to return the headrest 1 to its original, upright position. The height of the headrest 1 can be controlled by stopping the actuation of the electric motor 28 and by engagement between the threaded rod 26 and the nut member 19. As a means for rotating the threaded rod 26, a manual handle can be used instead of the electric motor 28.

What is claimed is:

1. An apparatus for adjusting the position of a headrest with respect to a vehicle seat, the seat including a back having a top and a frame, comprising:
    guide means including at least one guide rail for connection to the frame;
    a pair of stays for connection to the headrest;
    a pair of shoes, one shoe being attached to each stay for movement with respect to the guide rail;
    means, interacting with the guide rail, for biasing the shoes against the guide rail; and
    means for moving the shoes with respect to the guide rail and for moving the headrest with respect to the top of the seat, said moving means including a rod member connected between the pair of shoes for movement therewith.

2. The apparatus of claim 1 wherein the moving means also includes means, substantially confined within the seatback, for turning the headrest with respect to the plane of the seatback.

3. The apparatus of claim 2 wherein the turning means includes camming means interacting with the shoe means for rotating the headrest with respect to the plane of the seatback.

4. The headrest apparatus of claim 3, wherein said camming means includes a pair of cam members, each cam member having a slit therein, and wherein each stay has a flat portion movable through said slit in each said cam member to allow said stays to be rotated relative to the plane of the seat back as said shoes interact with said cam members.

5. The apparatus of claim 1, wherein said biasing means includes a leaf spring.

6. The headrest apparatus of claim 1, wherein each said shoe has an aperture sized for receiving the rod member.

7. The headrest apparatus of claim 1, wherein each said guide rail has a lateral wall portion including an elongated hole for slidable movement of the rod member therein.

8. The headrest apparatus of claim 1 further comprising a nut member connected to a central portion of said rod member.

9. The headrest apparatus of claim 8, wherein said means for moving includes a threaded rod engageable with said nut member for moving said rod member and said shoes along said guide rails upon rotation of said threaded rod.

10. The headrest apparatus of claim 9 including means for providing a rotational torque to said threaded rod.

11. The headrest apparatus of claim 10, wherein said rotational torque means comprises a gear box engageable with said threaded rod, and a cable, connected at one end to said gear box and at the other end to an electric motor, said cable being rotated by said electric motor to thereby rotate said threaded rod.

* * * * *